United States Patent                                                     [15]  3,697,989
Bailey et al.                                                            [45]  Oct. 10, 1972

[54] INTRUSION DETECTION APPARATUS HAVING SUPERVISORY CONTROL MEANS

[72] Inventors: James R. Bailey, Milwaukee, Wis.; Paul I. Corbell, Dallas, Tex.; Lawrence B. Korta, Milwaukee, Wis.

[73] Assignee: Johnson Service Company, Milwaukee, Wis.

[22] Filed: March 10, 1969

[21] Appl. No.: 805,591

[52] U.S. Cl. ............... 343/5 PD, 340/258 A, 343/7.7
[51] Int. Cl. ............................................... G01s 9/42
[58] Field of Search ............... 343/5 PD, 7.7, 258 A

[56] References Cited

UNITED STATES PATENTS 2,779,936  1/1957  Loudon et al. ......... 340/258 A
3,242,486  3/1966  Corbell .................... 343/5 PD
3,378,834  4/1968  Corbell .................... 343/5 PD
3,383,678  5/1968  Palmer .................... 343/5 PD Primary Examiner—Malcolm F. Hubler
Attorney—Andrus, Sceales, Starke & Sawall

[57] ABSTRACT

The illustrated detection apparatus includes a radio frequency transmitter and a receiver having an amplifier which has a constant gain portion and a following roll-off above the highest motion Doppler frequency signal to be detected. The transmitter is a Clapp oscillator. A free running multi-vibrator is coupled into a voltage regulator of the bias supply of the Clapp oscillator to superimpose a supervisory signal which falls within the roll-off portion.

14 Claims, 3 Drawing Figures

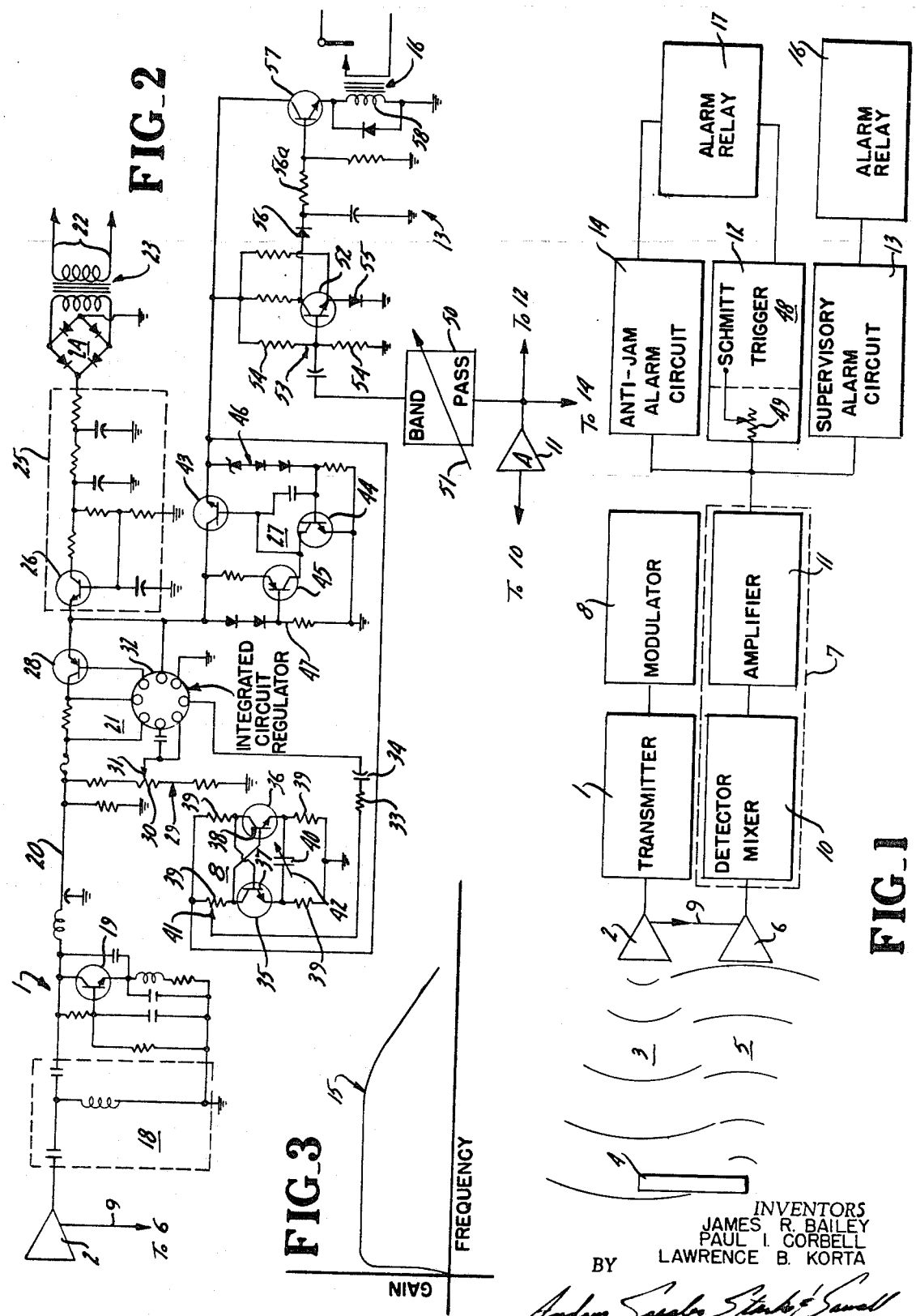

INTRUSION DETECTION APPARATUS HAVING SUPERVISORY CONTROL MEANS

This invention relates to an intrusion detection apparatus having a supervisory control to indicate failure of the apparatus.

Intrusion detection systems have been developed employing microwave energy within the area to be protected. A receiving means is mounted to receive at least an intruder intercept related portion of the transmitted energy, either directly or as a reflected signal from a body or target moving within the area being protected. The motion of a body or target within the area generates a Doppler frequency signal in the receiving means which results in the triggering of an alarm. For example, highly satisfactory systems are shown in the Corbell U.S. Pat. Nos. 3,242,486 and 3,378,834 employing amplitude discrimination of a single cycle of an amplified Doppler frequency motion signal to trigger an alarm. As disclosed in the two patents, a Klystron tube is employed to establish a microwave signal in the X-band portion of the spectrum and a supervisory control signal is preferably superimposed up on the microwave signal to insure that the detection system is in proper operating condition at all times. In the first Corbell patent, a low level background signal of the Doppler frequency but of insufficient peak amplitude to operate the alarm is employed in connection with a signal integrating circuit to produce a supervisory control signal. The low level background signal is obtained by employing a poorly filtered energization circuit driving the Klystron tube. For example, the Klystron may be pulsed with $4K_c$(Hertz) modulation as a result of the improper filtering and superimposed upon a 10.525 transmitted signal.

The second Corbell patent suggests an improvement particularly for a perimeter type system wherein the transmitter Klystron is pulsed by the action of a DC to DC converter supply to superimpose a high frequency signal on the transmitted signal. For example, a 5,000 H signal may be inserted to pulse the Klystron microwave source and thereby provide a signal of a frequency substantially greater than the motion detection Doppler frequencies. This supervisory frequency signal is substantially removed from the Doppler frequency signals and the two signals are essentially isolated at the receiving means by suitable filtering means.

In using the background or apparent Doppler frequency signal, there is some danger of mis-triggering of the circuit by response to the supervisory signals as if there were an actual intrusion. In the pulsed control circuit, the substantially higher frequency of the supervisory signal requires that the common amplifier be shaped to pass both the Doppler frequency and the high modulation frequency. Although this circuit eliminates the problem associated with the use of an apparent Doppler frequency, the amplifier characteristic results in a relatively large gap between the Doppler band and the supervisory band, which has been found to establish a potentially vulnerable jamming area. An intruder with highly sophisticated equipment can detect the operating frequency characteristics of the motion detection unit an by properly feeding a signal intermediate the Doppler frequency signals and the supervisory frequency signals saturate the detection amplifier without triggering of either the supervisory or alarm circuitry. The system is thereby desensitized and cannot readily detect the Doppler frequency signals established by target motion and consequently cannot properly detect intrusion. Although the jamming would require sophisticated apparatus and the like, the possibility of jamming is considered undesirable for unusually high security applications, such as, for example are found in many governmental requirements.

The present invention is particularly directed to a highly improved supervisory control system which substantially minimizes the possibility of jamming while maintaining complete supervisory control independent of the Doppler frequency signals.

In accordance with the present invention, a receiving system is constructed with a pass band characteristic adapted to transmit the normal target Doppler frequencies with essentially a constant gain. The gain characteristic progressively and continuously decreases or rolls off above the selected highest motion Doppler frequency signal to be detected. A frequency modulation low relative to the transmitted frequency is superimposed on the transmitted signal through the use of a separate controllable modulating source, and a portion of the transmitted signal is fed directly to the receiving means. Generally, the modulation frequency is selected within the roll-off portion of the frequency response or gain characteristic of the receiving means. In this manner, the supervisory signal can be placed close to, but outside the target Doppler frequency band, to minimize the possible jamming signal spectrum. Furthermore, by using a completely separate and controllable oscillator, the amplitude and/or the frequency of the modulating signal can be adjusted within a limited region to provide a coded type response. Thus, the modulating frequency can be set to establish a given amplitude and/or frequency of modulation during a first time period and a completely different amplitude and/or frequency of modulation during another time.

The present invention is particularly directed to an intrusion detection apparatus operating in the lower portion such as the S-band of the microwave energy spectrum. This permits construction of a completely solid state transmitting means and receiving means. The supervisory control can employ a separate solid state oscillator, such as multivibrator audio oscillator, interconnected to the bias supply connection of the transmitting oscillator, such as a Clapp oscillator, to superimpose the modulating signal on the transmitted microwave frequency. For example, a free running multi-vibrator may be coupled into a voltage regulator of the bias supply of the Clapp oscillator. This construction provides a compact long life and reliable intrusion detection apparatus at minimum cost.

The drawings furnished herewith illustrate the best mode presently contemplated by the inventors for carrying out the subject invention in which the above advantages and features are clearly disclosed, as well as others, which will be readily understood from the following description of such embodiment.

In the drawing:

FIG. 1 is a diagrammatic illustration of a intrusion detection apparatus incorporating the subject matter of the present invention;

FIG. 2 illustrates a typical gain characteristic of the receiver amplifier shown in FIG. 1; and FIG. 3 is a schematic circuit diagram showing a preferred construction of the modulation control circuitry and the associated response circuitry of the receiving means.

Referring to the drawings, and particularly to FIG. 1, the illustrated embodiment of the invention includes a transmitter oscillator 1 coupled to a transmitting antenna 2 and adapted to establish a microwave energy field or beam 3. A target 4, such as a moving person within the energy field 3, establishes a reflected energy beam or field 5 which is related to the motion of the target. A receiving antenna 6 is mounted in the illustrated embodiment of the invention adjacent the transmitting antenna 2 to intercept the reflected signal or energy field and transmit a related signal to a suitable receiver 7.

In accordance with the present invention, a supervisory modulator 8, shown as an audio oscillator, is connected to modulate the output of the transmitter oscillator 1. The transmitter oscillator 1 is also directly coupled to the receiver 7 as by the coupling line 9 to continuously transmit a portion of the output of the transmitter oscillator 1 to the receiver 7. The receiver may include a well-known crystal detector and mixer 10 which transmits the receiver energy to a variable gain amplifier 11. The output of the amplifier 11 is connected in common to a motion alarm circuit 12 and, to a supervisory alarm circuit 13 and to an anti-jam circuit 14.

The present invention is particularly adapted to employ a solid state circuitry with the transmitter oscillator 1 generating frequencies in the S-band of the microwave frequency spectrum; for example, 2.45 GH$_z$ (gigahertz). The Doppler frequency signals related to human motion anywhere within the field 3, will fall within a range of 1 to 150 Hertz.

In accordance with the present invention, the amplifier 11 is constructed to have a gain characteristic, generally as shown by the curve 15 in FIG. 2, and which is particularly related to the Doppler frequency signals associated with the target motion within the energy field 3 to be detected. The amplifier 11 for the above example is therefore shaped to provide essentially constant gain over the selected Doppler frequency range or band of 1 to 150 H$_z$ and to rapidly roll off above 150 H$_z$.

The supervisory modulator 8 establishes a modulation frequency within the roll-off portion of the gain characteristic 15 and preferably just immediately outside the target Doppler motion band. In the particular illustrated system, a modulating frequency of 500 H$_z$ provides a relatively narrow gap between the Doppler frequency motion band and the supervisory frequency and produces a circuit particularly adapted to practical intrusion detection apparatus for detecting intrusion by a human.

The output of the amplifier 11 is connected simultaneously to provide an input signal to the three detection circuits, including the motion alarm circuit 12, the supervisory alarm circuit 13 and the anti-jam alarm circuit 14. The supervisory alarm circuit 13 is interconnected to actuate a supervisory alarm such as a supervisory alarm relay 16. The motion alarm circuit 12 and the anti-jam alarm circuit 14 are connected to conjointly control a motion alarm such as a motion alarm relay 17; for example, as more fully disclosed in the copending application of Corbell etal entitled, Intrusion Detection Apparatus Having Anti-Jamming Protection System, filed on Mar. 10, 1969 and bearing Ser. No. 805,622. The antijam circuit 14 as disclosed therein is constructed to establish an output if the amplitude of the output of amplifier 11 increases above the normal level. This prevents desensitizing of the system by saturating the amplifier 11 with a modulating signal which does not actuate either of the other two circuits. The circuit may be similar to that disclosed in the above-referred to application of Paul I. Corbell et al. and thus no further detail is given in the present application. Similarly, the motion alarm circuit 12 may advantageously include a Schmitt trigger circuit, as disclosed in Corbell U.S. Pat. No. 3,242,486. If either of the circuits 12 or 14 is actuated, the alarm relay 17 is operated to indicate a major fault; that is, an intruder within field 3, or someone trying to jam the system.

The supervisory alarm circuit 13 is set to respond to the modulation frequency of the supervisory modulator 8. If the transmission of this signal decreases significantly for any reason, the alarm circuit is energized to actuate the supervisory relay 16 and establish an indication of a more or less minor fault.

More particularly, in the illustrated embodiment of the invention, as shown in FIG. 3, the transmitter 1 is a solid state coaxial cavity oscillator having a coaxial cavity 18 and coupled therethrough to the transmitting antenna 2. The illustrated oscillator is of a basic Clapp-type oscillator circuit employing as the active element an NPN transistor 19 connected in an emitter configuration with the output coupled to excite the coaxial cavity 18 through an capacitive coupling means in accordance with any well-known or operative connection. The cavity 18 is coupled to the antenna 2 for transmitting of field 3 and through antenna 2 to antenna 6 to transmit a portion of the energy directly to the receiving means. A particularly satisfactory oscillator circuit 1 is interconnected via a bias supply line 20 to a voltage regulator 21 which supplies a predetermined direct current bias to the oscillator and thereby establishes the frequency of oscillation and the output frequency of cavity 18.

In the illustrated embodiment of the invention, the voltage regulator 21 connects the D.C. supply line 20 to a set of A.C. incoming power lines 22 through a transformer 23 and a full-wave diode bridge rectifier 24. A filter network 25 is connected across the output of the rectifier 24 to essentially eliminate the ripple and establish a constant DC power supply, and includes a capacitive multiplier transistor 26 connecting the output of the filter circuit 25 to the regulator 21 and to a receiver-modulator supply voltage regulator 27.

The transmitter regulator 21 includes a series regulating transistor 28 connected between the bias supply line 20 and the coupling transistor 26. A voltage dividing network 29, including an adjustable potentiometer 30 provides a feedback signal proportional to the output voltage. The tap 31 of the potentiometer 30 is connected in circuit to the transistor 28 and the supply line 20 through a solid state integrated circuit 32 to maintain the voltage at the line 20 at a closely regulated output voltage in accordance with the setting of tap 31.

In accordance with the present invention, the supervisory signal modulator 12 is connected by a series connected resistor 33 and capacitor 34 to the voltage regulating circuit 32 to modulate the constant DC bias voltage established by the setting of tap 31. The circuit 32 thus combines the feedback voltage and the modulating voltage to produce an accurately modulated bias supply. Although any suitable circuit 32 may be employed, applicants have found that an integrated circuit, made by National Semiconductor and identified by number LM 300, is particularly satisfactory.

In the illustrated body of the invention modulator 8 is a solid state free running multivibrator having a pair of NPN transistors 35 and 36 interconnected in a known circuit to the receiver-modulator voltage regulator 27. The bases 37 and 38 of the transistors are directly interconnected. Suitable collector and emitter resistors 39 are connected to the corresponding elements of the transistors and interconnected to the receiver-modulator voltage regulator 27. A capacitor 40 connects the emitters of the transistors 35 and 36 to produce a free running multivibrator circuit. The voltage output of the multivibrator is controlled by providing an adjustable tap 41 to the collector resistor 39 of the first transistor 35. The tap 41 of the resistor is (RC) resistance-capacitor coupled to the regulating circuit 32 to algebraically add the output voltage of the modulator 8 to the constant DC voltage output of the regulator as set by the potentiometer tap 31. The capacitor 40 is also made adjustable, as shown be arrow 42, to permit changing of the frequency of the modulator output for optimum system control. The adjustable resistor 39 and capacitor 40 thereby permits individual control of the frequency and/or the amplitude of the bias modulation voltage supplied to the Clapp oscillator 1.

The receiver-modulator voltage regulator 27 is set at a fixed output voltage and includes a series regulating transistor 43 interconnected to the output of the transistor 26 with the input to the transistor controlled by a pair of cascaded control transistors 44 and 45. The input circuit of control transistor 44 is connected to the output voltage of transistor 43 through a suitable reference diode network 46. The input of the transistor 45 is connected to the output of the DC power supply through a resistor diode network 47. As a result, the base current and the related output circuit of the series regulating transistor 43 is adjusted by the control transistors 44 and 45 to maintain the output voltage at a desired level. This regulated voltage is interconnected as the bias supply to the receiver and alarm circuitry and to the signal modulator 8.

The bias voltage to the Clapp oscillator 1 may therefore be defined by the equation $V_b = V_{dc} + V_m \sin(2\pi f_m t)$ where the sub-m refers to the modulator 8 output and $V_{dc}$ is the bias voltage in the absence of the modulator output. The output of the Clapp oscillator 1 is therefore a microwave frequency determined by the DC bias modulated in accordance with the signal from the multivibrator circuit 8. The signal in the coaxial cavity 18 is a corresponding combination of the microwave detection frequency and the modulation frequency. The energy is coupled to the transmitting antenna 2 and to the receiving antenna 6, for example, as shown in the Corbell patent or the copending application of Corbell et al. entitled, Wave Guide Antenna Structure for Intrusion Detection Apparatus, filed on Mar. 10, 1969, having Ser. No. 805,590 application and assigned to the same assignee.

The receiving means 7 includes the radio frequency detector and mixer 10 which provides an output signal proportional to the transmitted signal and the difference or Doppler frequency signal. The Doppler frequency signal is amplified by the variable gain amplifier 11.

A Schmitt trigger circuit 48 of the alarm circuit 12 is interconnected to the output of the amplifier 11 through an adjustable potentiometer or resistor 49, for example, as shown in the Corbell patent 3,242,486. The Schmitt trigger circuit is provided with a filter network to pass only the Doppler frequencies to thus control the alarm relay 17 in accordance with the amplitude of the Doppler frequency signals within the constant gain characteristic of the amplifier. The trigger circuit may include a variable potentiometers or the like to determine the minimum amplitude of the Doppler frequency signal which is effective to fire or actuate the Schmitt trigger circuit. The resistor 49 further loads the amplifier 11 and controls the output swing of the amplifier thereby permits adjustment of the effective gain characteristic.

For example, as previously noted, the transistor oscillator may be operated to generate a basic microwave frequency of 2.45 GH$_z$. The multivibrator circuit 8 modulates this frequency to establish a modulating control signal of 500 H$_z$. The human or target motion Doppler frequency passband of the amplifier is designed to have an essentially constant gain over the range of 1 to 150 H$_z$ and to rapidly roll off or decrease in a continuous and progressive manner above 150 H$_z$ through and including the modulation detection frequency of 500 H$_z$.

The output of the amplifier 11 is coupled to the supervisory alarm circuit 13 through a tunable band-pass filter network 50 which can be adjusted to transmit only the modulating frequency signal established by the multivibrator circuit 8. The band-pass filter network 50 may be of any suitable capacitive-inductance construction in accordance with well-known circuitry and is shown as an appropriately labeled block diagram for simplicity and clarity of explanation. An arrow 51 through the network 50 indicates the filter is adjustable to permit relating of the receiving network 50 to the adjustment of the frequency of the multivibrator circuit 8.

The output of network 50 is coupled to drive a supervisory alarm transistor 52 which is interconnected to the voltage supply line from regulator 27 through a biasing network 53 including voltage dividing resistors 54. The transistor 52 has its emitter connected to ground in series with a diode 55. In the absence of an input signal from the amplifier 11, the power supply biases the transistor 52 to conduct, thereby holding the collector essentially at ground level. The output of the transistor 52 is coupled through a diode 56 and resistor 56a to the input of a relay control transistor 57 connected in series with the winding 58 of the supervisory relay 16. With the input transistor 52 conducting, the base of transistor 57 is held essentially at ground and consequently the transistor 57 is biased off. This deenergizes the relay 16 and produces an alarm related to a supervisory function and in particular, indicating that the system is not functioning. Relay 16 is maintained separate from the alarm relay 17 and can employ a completely distinct alarm to indicate the seriousness of the fault.

As long as the system is operating properly, the modulating signal is transmitted through the tunable band-pass filter 50. The signal is applied to the base of the transistor 52 and the negative half cycle of each cycle overcomes the positive bias from the supply, reduces the conduction of the transistor 52 and biases the transistor 52 off. The collector of the transistor 52 therefore rises to a positive voltage which is coupled to the base of the second transistor 57 and biases the transistor 57 to conduct. This, in turn, causes energization of the supervisory relay winding 58 to hold it in a standby condition, similar to the relay supervisory control relay disclosed in the Corbell U.S. Pat. No. 3,242,486.

In summary, the operation of the illustrated embodiment of the invention is briefly summarized as follows.

The system is set with the transmitter and the receiving antennas 2 and 6 properly located with respect to the control field 3. A particular advantageous packing is disclosed in the copending application of Corbell et al. entitled, Wave Guide Antenna Structure for Intrusion Detection Apparatus, filed on Mar. 10, 1969 having Ser. No. 805,590 and assigned to the same assignee. The transmitting oscillator 1 and the audio oscillator 8 are energized to establish the microwave field in cavity 18; modulated in accordance with the output of the audio oscillator 8. The amplifier gain adjustment is set to provide the constant gain over the desired Doppler frequency range with the roll off adjacent the uppermost frequency to be detected. The particular degree of modulation, both as to amplitude and as to frequency, is controlled by adjustment of the variable resistor 41 and the variable capacitor 40 of the multivibrator circuit of FIG. 3. The tunable band-pass filter 50 is set to pass the modulation frequency to the supervisory input transistor 52.

If a target moves within the energy field, the movement will create a Doppler frequency signal related to the speed of target movement. The amplitude of the Doppler signal is determined by the range, size and reflective characteristics of the target. The signal is transmitted via the amplifier 11 to the several supervisory and alarm circuits 12–14. The Doppler frequency signal is applied to the motion alarm circuit 12 and if it exceeds the amplitude level for which the potentiometer 49 is set, it will immediately trigger the corresponding alarm circuit and actuate the related alarm relay 16. If the target range, size or reflective characteristic is such that the Doppler frequency's amplitude is below the set level, no alarm results. The Doppler frequency signal is applied to the anti-jam alarm trigger circuit, but as more fully disclosed in the referred to copending application, the magnitude is generally insufficient to cause triggering.

The Doppler frequency signal may be also applied to the supervisory alarm circuit 13, but does not effect its function as the tunable band pass filter blocks the signal.

The modulating frequency appears at the output of the amplifier 11 as long as the audio oscillator 8, and transmitter 1 and receiver 7 operating properly. This signal is passed by the band pass filter 50 to energize the input transistor 52 of the supervisory alarm circuit 13 and to hole the supervisory relay 16 in a standby position. If any part of the transmitter 1, oscillator 8 or receiver 7 should malfunction or be disconnected, the signal is removed and the supervisory relay 16 deenergized to establish a corresponding signal.

The supervisory alarm modulating frequency has both the amplitude and the frequency characteristic adjusted to optimize system performance. It is preferably selected to appear on the high frequency roll off portion of the amplifier band pass and slightly outside of the target Doppler band. Thus, the supervisory signal is separated from the motion Doppler signals to be detected solely on the basis of the frequency characteristic. The supervisory circuit thus provides an absolute amplitude discrimination for the motion detection and the supervisory detection.

Additionally, the system can be coded to the characteristic of the modulation signal and thus minimize the danger of jamming or masking of the motion detection signal. As previously noted and as more fully described in the related copending application, anti-jamming protection is provided by constructing the circuit 14 to respond to saturation of the amplifier 11; caused for example, by introduction of a signal existing between the modulating frequency signal and the Doppler frequency band pass range. In accordance with the present invention, the modulating frequency source 3 may be changed at periodic or arbitrary intervals, by adjustment of capacitor 40 in the illustrated embodiment, to operate at different frequencies. If desired, even a higher level of supervision can be obtained by providing coded information in the modulation of the transmitted signal with a corresponding de-coding circuitry in the supervisory circuit. Of course, changing the amplitude of the modulation with the corresponding change in the other circuitry can be employed as a form of coded information and thus provide an additional dimension in the supervisory capacity of the system.

Adjustment of the supervisory modulator 8 might also be desirable to permit convenient adjustment for variations and tolerances in the amplifier band pass characteristic. This will provide a fixed supervisory level control which is essentially independent of the system operating conditions and environments.

The present invention thus provides a Doppler frequency type intrusion detection system having a controlled modulating frequency which can be precisely controlled and adjusted to provide optimum response and supervisory control by selecting a particular frequency which is interrelated to the roll off portion of the amplifying or gain control device of the intrusion detection system.

We claim:

1. An intrusion detection system, comprising a microwave transmitter means for radiating a microwave field into an area, receiver means for receiving said energy, an amplifying means connected to the output of the receiver means and having a selected gain characteristic including a first gain portion over a selected frequency range related to selected motion of a target within said microwave field and a different and lesser gain portion with frequencies above said frequency range, discriminating means connected to said amplifying means to detect signals within said first gain portion, and a supervisory modulating means coupled to the transmitter means to modulate the transmitter field and establishing a supervisory signal in said amplifying means having a frequency within said lesser gain portion, and a supervisory response means connected to said amplifying means and responsive to said supervisory signal.

2. The intrusion detection system of claim 1, wherein said modulating means includes means to adjust the frequency and the amplitude of the supervisory signal and said supervisory response means having means to correspondingly adjust the response to said supervisory signal.

3. The intrusion detection system of claim 1, wherein said discriminating means is responsive to signals of a predetermined minimum amplitude within said first gain portion, and having second discriminating means connected to said amplifying means and responding to an output signal of a predetermined greater amplitude than said predetermined minimum amplitude.

4. The intrusion detection system of claim 1, wherein said transmitter means includes a solid state Clapp oscillator having a coaxial cavity, a solid state direct current voltage regulator having a series connected transistor regulating the bias supply to said Clapp oscillator and biasing said oscillator to generate said microwave field, said modulating means including a multivibrator circuit establishing an alternating current output voltage within said decreasing gain portion and having a variable resistor to vary the amplitude of the voltage and a variable capacitor to vary the frequency of the voltage, the multivibrator circuit being connected to modulate said voltage regulator and thereby the bias supply to said Clapp oscillator to establish said modulation of the transmitted signal, said amplifying means including an adjustable load resistor connecting the amplifying means to the discriminating means and producing gain adjustment of the amplifying means, said supervisory response means including a tunable band pass filter directly connected to the output of the amplifying means and to an output responsive means.

5. The intrusion detection system of claim 4, having a second voltage regulator connected as the bias supply to said receiving means and to said multivibrator circuit.

6. The intrusion detection system of claim 1, wherein said transmitter means includes a solid state microwave oscillator having a regulated direct current bias supply, said supervisory modulating means is a solid state multivibrator coupled to modulate the bias supply of the transmitter.

7. The intrusion detection system of claim 6, wherein said multivibrator includes an adjustable capacitor means connected in the circuit of the multivibrator to adjust the frequency and an adjustable resistor connected in the circuit of the multivibrator to adjust the amplitude of the supervisory signal.

8. The intrusion detection system of claim 1, wherein said first gain portion is a relatively constant gain over said related frequency range and the lesser gain portion is a progressively decreasing gain with increasing frequencies, and said discriminating means is responsive to signals of a predetermined minimum amplitude.

9. The intrusion detection system of claim 8, wherein said transmitter means includes a solid state oscillator having a coaxial transmitting cavity, a solid state direct current voltage regulator connected as the bias supply to said oscillator to generate said microwave field, said modulating means including a solid state supervisory oscillator establishing an alternating current output voltage of a frequency within said decreasin gain portion and having a variable resistor connected in the circuit of the oscillator to vary the amplitude of the voltage and a variable capacitor connected in the circuit of the oscillator to vary the frequency of the voltage, the supervisory oscillator being connected to modulate said regulator and thereby the bias supply to said first solid state oscillator to establish said modulation of the transmitted field.

10. The intrusion detection system of claim 9 having a variable resistor connecting said amplifying means to said discriminating means and said supervisory response means is a solid state triggered switch means connected directly to the amplifying means.

11. The intrusion detection system of claim 8, wherein said transmitter means includes a solid state oscillator coupled to a coaxial cavity, a solid state direct current voltage regulator connected as the bias supply to said solid state oscillator and biasing said oscillator to generate said microwave field, said modulating mans including a solid state multivibrator circuit establishing an alternating current output voltage within said decreasing gain portion and having a variable resistor connected in the circuit of the multivibrator to vary the amplitude of the voltage and a variable capacitor connected in the circuit of the multivibrator to vary the frequency of the voltage, the multivibrator circuit being connected to said regulator and modulating the output of said regulator and the bias of said solid state oscillator to establish said modulation of the transmitted field.

12. An intrusion detection system comprising transmitter means having a solid state microwave oscillator and an antenna connected to said oscillator for radiating a microwave energy field into an area, receiver means mounted in said area for receiving said energy and detecting preselected Doppler frequencies related to selected motion of a target within said energy field, and a solid state supervisory oscillator means coupled to said microwave oscillator and modulating the transmitted field and establishing a supervisory signal having a frequency different than said preselected Doppler frequencies, and a supervisory response means connected to said receiver means to respond to said supervisory signal, said supervisory oscillator includes means connected in the circuit of the oscillator to adjust the frequency of the supervisory signal.

13. An intrusion detection system comprising transmitter means having a solid state microwave oscillator and an antenna connected to said oscillator for radiating a microwave energy field into an area, receiver means mounted in said area for receiving said energy and detecting preselected Doppler frequencies related to selected motion of a target within said energy field, and a solid state supervisory oscillator means coupled to said microwave oscillator and modulating the transmitted field and establishing a supervisory signal having a frequency different than said preselected Doppler frequencies, said frequency of said supervisory signal and said Doppler frequencies both of the same order of magnitude, and a supervisory response means connected to said receiver means to respond to said supervisory signal, said supervisory oscillator includes means connected in the circuit if the oscillator to adjust the amplitude of the supervisory signal.

14. An intrusion detection system comprising transmitter means having a solid state microwave oscillator and an antenna connected to said oscillator for radiating a microwave energy field into an area, receiver means mounted in said area for receiving said energy and detecting preselected Doppler frequencies related to selected motion of a target within said energy field, and a solid state supervisory oscillator means coupled to said microwave oscillator and modulating the transmitted field and establishing a supervisory signal having a frequency different than said preselected Doppler frequencies, said frequency of said supervisory signal and said DOppler frequencies both of the same order of magnitude, an amplifying means connected to the output of the receiver means and having a selected gain characteristic including a relatively constant gain over the range of said preselected Doppler frequencies and a progressively decreasing gain portion with increasing frequencies and a supervisory response means connected to said amplifying to respond to said supervisory signal.

* * * * *